United States Patent [19]

Candle

[11] 3,924,363
[45] Dec. 9, 1975

[54] INFLATABLE SHELTER
[75] Inventor: Richard D. Candle, Akron, Ohio
[73] Assignee: The Goodyear Tire & Rubber Company, Akron, Ohio
[22] Filed: May 22, 1974
[21] Appl. No.: 472,315

[52] U.S. Cl. .............................. 52/2; 52/80; 52/222; 52/292
[51] Int. Cl.² ........................................ E04B 1/345
[58] Field of Search .......... 52/2; 244/142, 145, 146, 244/9; 52/222, 292

[56] References Cited
UNITED STATES PATENTS

| | | | |
|---|---|---|---|
| 2,104,966 | 1/1938 | Baker | 244/145 |
| 2,117,319 | 5/1938 | Hart | 244/145 |
| 2,356,493 | 8/1944 | Smith | 244/145 |
| 2,577,047 | 12/1951 | Taylor | 244/145 |
| 2,863,467 | 12/1958 | Hearell | 52/2 |
| 3,169,542 | 2/1965 | Neumark | 52/2 |
| 3,256,895 | 6/1966 | Daquette | 52/2 |
| 3,561,174 | 2/1971 | Schneidler | 52/2 |
| 3,740,902 | 6/1973 | Sinoski | 52/2 |
| 3,742,657 | 7/1973 | Price | 52/2 |

FOREIGN PATENTS OR APPLICATIONS

| | | | |
|---|---|---|---|
| 1,027,437 | 4/1966 | United Kingdom | 52/2 |
| 478,320 | 10/1969 | Switzerland | 52/2 |
| 1,309,319 | 10/1962 | France | 52/2 |

OTHER PUBLICATIONS
Prefabrication, Dec. 1957, pp. 66, 67.

Primary Examiner—Frank L. Abbott
Assistant Examiner—Henry Raduazo
Attorney, Agent, or Firm—F. W. Brunner; P. E. Milliken

[57] ABSTRACT

A cable-reinforced inflatable shelter having a group of radially extending cables to which are attached either non-tailored or partially tailored strips of flexible sheet material forming an envelope. Each strip of envelope material has its opposite marginal side edges connected between an adjacent pair of cables. The cables converge at the radially inner ends and the sheet material is of such shape that there is an excess width of material toward the radially inner end of the cables and this excess material is forced outwardly by internal pressure when the shelter is inflated thereby forming pleats which extend outwardly beyond the cables a progressively greater distance from the radially outer ends of the cables to the radially inner ends thereof. The shelter may be made in the shape of a portion of a sphere, a torus or combinations of these two shapes. The shapes may also be altered by using circumferential rings and vertical tether cables.

19 Claims, 21 Drawing Figures

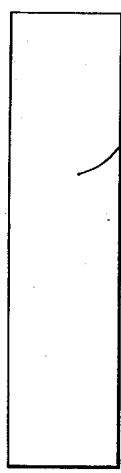
FIG. 3
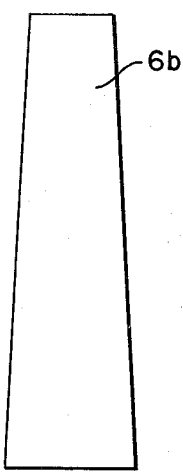
FIG. 4
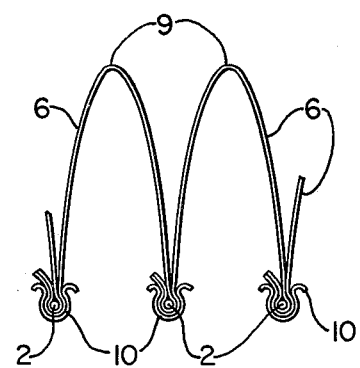
FIG. 6
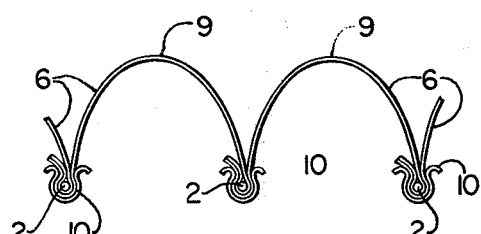
FIG. 7
FIG. 5
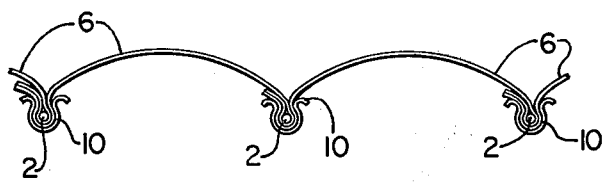
FIG. 8
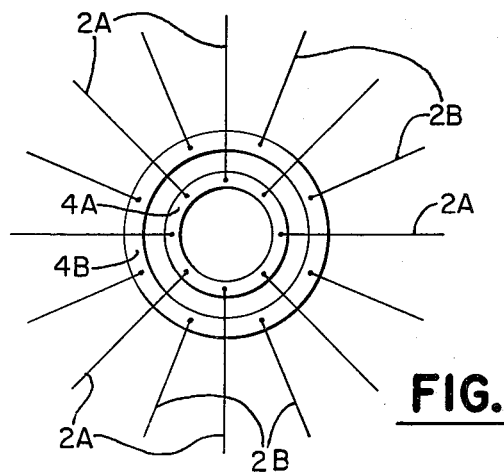
FIG. 9
FIG. 11
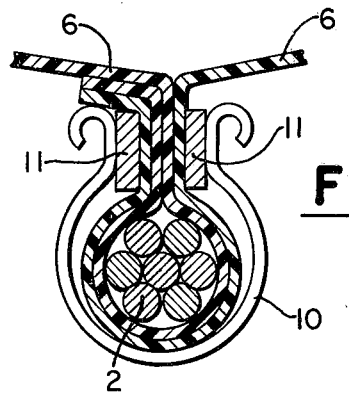
FIG. 12

INFLATABLE SHELTER

This invention relates to an inflatable shelter of circular shape having non-parallel cables reinforcing an envelope made of strips of flexible sheet material with an excess of width of the sheet material forming pleats extending outwardly beyond the cables when the shelter is inflated.

BACKGROUND OF THE INVENTION

The prior art discloses various types of inflatable shelters including those shaped in the form of part of a sphere and having radially extending reinforcing cables or the like which aid in relieving the stresses imparted to the envelope by the internal pressure of the shelter and by external wind loads which impinge upon the exterior surface of the shelter. The closest prior art known to the applicant are U.S. Pat. No. 3,035,590 issued to E. N. Helmers and U.S. Pat. No. 3,023,758 issued to J. N. Diehl. All of the prior art patents known to applicant show the use of tapered gores which must be cut to the desired contour to provide a relatively smooth spherical surface. The necessity of tailoring the gores of envelope material necessarily adds to the expense of the manufacturing and assembly of the structure.

OBJECTS OF THE INVENTION

It is an object of this invention to provide an inflatable shelter of circular peripheral shape in which either non-tailored or partially tailored strips of flexible sheet material are used as gores in forming the envelope of the shelter.

Another object of the invention is to provide an inflatable shelter in which the envelope is formed of strips of flexible sheet material of uniform width connected between non-parallel reinforcing cables.

A still further object of the invention is to provide an inflatable shelter in which excess width of sheet material forms pleats in the envelope extending outwardly beyond the reinforcing cable.

Another object of the invention is to provide an inflatable shelter which may be converted from one geometric shape to another without changing the peripheral edge contour of the sheet material forming the envelope.

These and other objects of the invention will become more fully apparent as the description proceeds in the following specification and the accompanying drawings.

BRIEF DESCRIPTION OF THE DRAWINGS

FIG. 3 is a plan view of one of the non-tailored strips of sheet material used to form the envelope of the inflatable shelters in the application;

FIG. 4 is a plan view of a partially tailored strip of sheet material which might be used with the shelter of the invention;

FIG. 5 is a plan view of a conventional fully tailored strip of sheet material such as that used on prior art shelters;

FIG. 6 is a fragmentary cross-sectional view taken on line 6—6 of FIG. 1;

FIG. 7 is a fragmentary cross-sectional view taken on line 7—7 of FIG. 1;

FIG. 8 is a fragmentary cross-sectional view taken on line 8—8 of FIG. 1;

FIG. 9 is a fragmentary cross-sectional view taken on line 9—9 of FIG. 1;

FIG. 11 is a fragmentary diagrammatic top plan view showing another modification of the invention in which the reinforcing cables of an inflatable shelter are connected to two concentric rings at the apex of a shelter;

FIG. 12 is a cross-sectional view taken on line line 12—12 of FIG. 1 showing a typical seam connected to one of the reinforcing cables of the shelter in FIG. 1;

DESCRIPTION OF THE PREFERRED EMBODIMENTS

In describing the various shapes of the shelters in the embodiment of the inventions shown and described in this application, references will be made to spherical shapes, torus shapes and cylindrical shapes. Such references do not necessarily indicate a complete sphere, a complete torus or a complete cylinder but may be used to describe portions of such a geometric shape when used individually or in combinations. References will also be made to reinforcing cables. However, the term "cables" for the purpose of this application should be defined broadly to cover any flexible elongated reinforcing member such as ropes, lines, cables or any other suitable reinforcing member.

Figure 1:
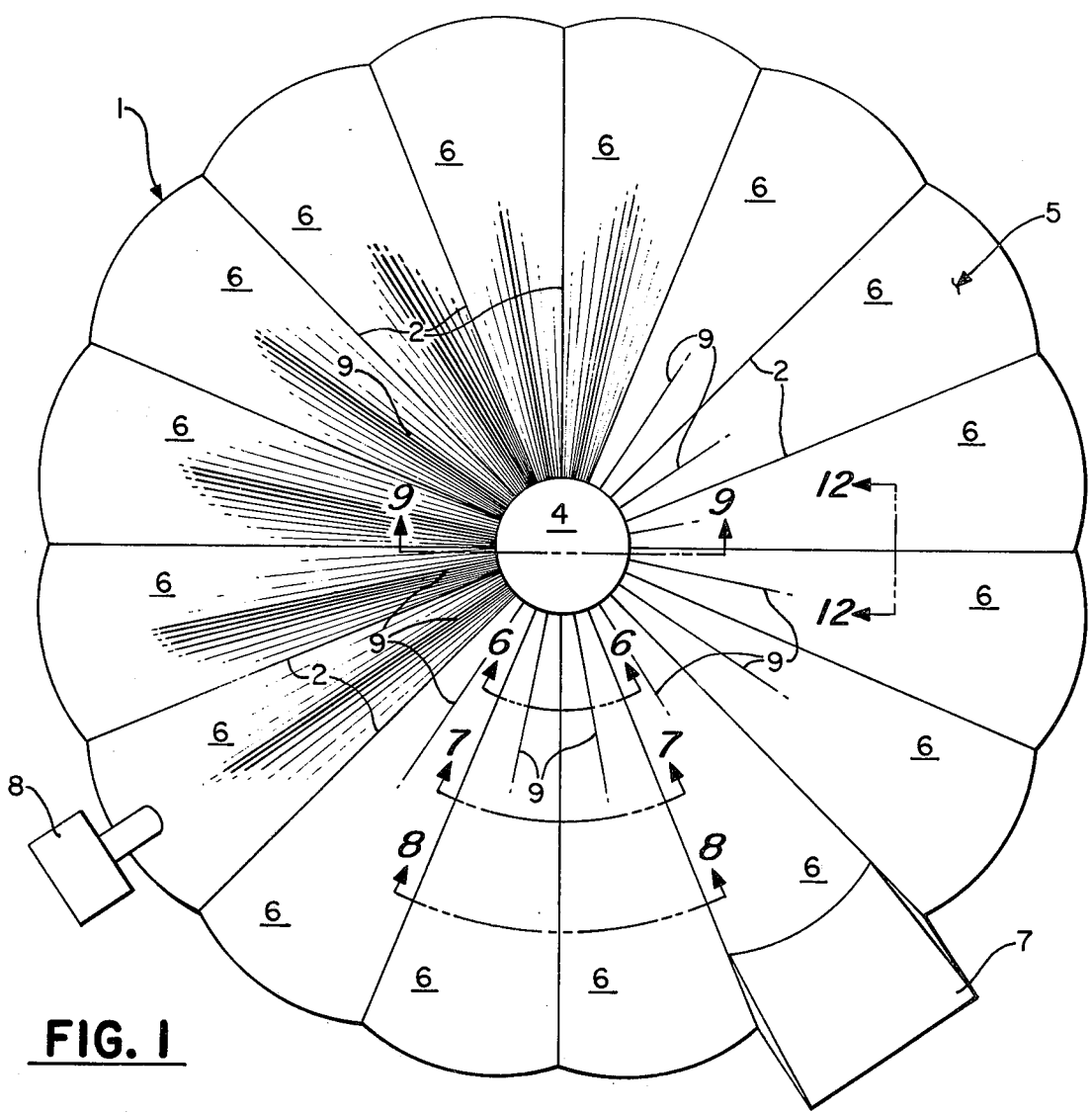
FIG. 1 is a top plan view of an inflatable shelter showing one embodiment of the invention.
Figure 2:
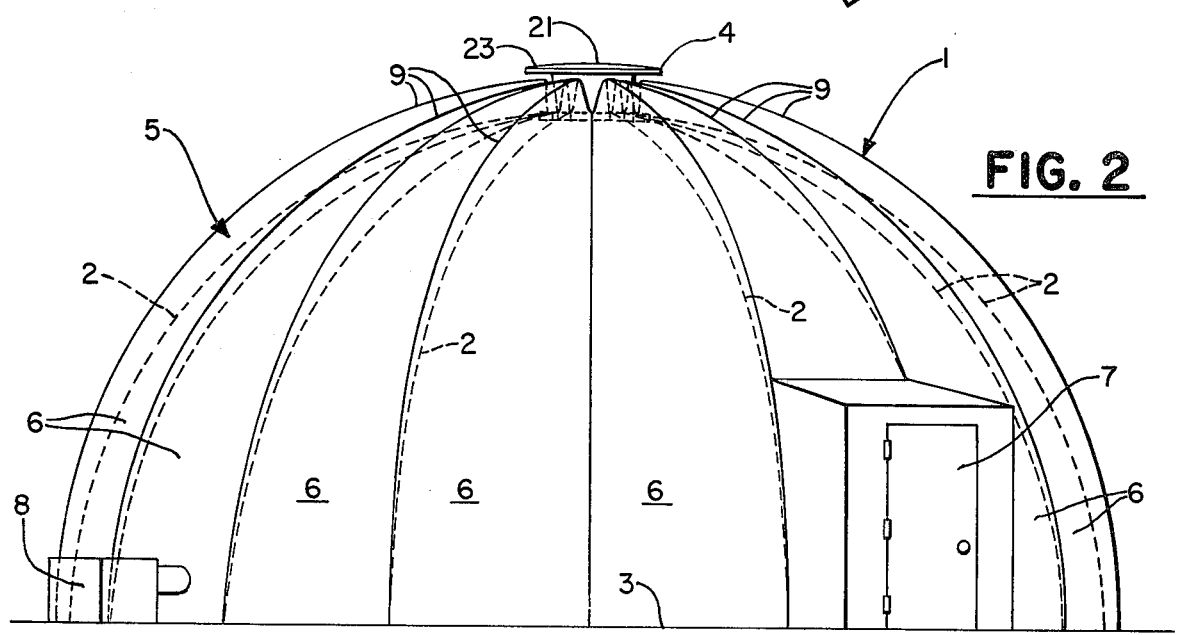
FIG. 2 is a side elevational view of the shelter shown in FIG. 1.

Referring now specifically to FIGS. 1 and 2 of the drawings, a shelter of hemispherical shape is indicated generally by the numeral 1. The shelter 1 is comprised of a plurality of radially extending reinforcing cables 2 having their radially outer ends anchored at spaced locations around the periphery of a base 3 and their radially inner ends attached to a centrally located retaining ring 4 which is axially aligned with the vertical center axis of the shelter 1. The ring 4 will be shown and described in greater detail in FIG. 9. The shelter 1 has an envelope 5 comprised of separate strips 6 of flexible sheet material. The strips 6 are either non-tailored and of uniform width throughout their length as shown in FIG. 3 as strip 6a, or may be partially tailored as shown in FIG. 4 as strip 6b. A prior art fully tailored strip 6c is shown in FIG. 5. The non-tailored strip 6a requires no labor in cutting but does use more material to cover a given area of a shelter. The partially tailored strip 6b provides a compromise between the non-tailored strip 6a and the fully tailored strip 6c. The strip 6b uses less material than the strip 6a and is easier to cut than the strip 6c since its side edges are cut straight rather than curved. These strips 6 may be made of plastic film, rubberized fabric or any other suitable flexible sheet material.

The shelter 1 has an access door 7 and an inflation blower fan 8 to provide air pressure to the interior of the shelter. While in the interest of simplicity an access door and blower fan has not been shown on the other embodiments of the invention described herein, it will be understood that such a door and blower is a basic part of such a structure and can be readily incorporated therewith.

One of the basic novel features of the present invention is the use of a non-tailored or only partially tailored strips of sheet material as shown in FIGS. 3 and 4 respectively attached between the reinforcing cables 2. In the past, it has been the practice to construct a spherical inflatable structure by using a plurality of tapered strips or gores of orange-peel shape such as 6c in FIG. 5. This was considered to be necessary in order to achieve a smooth spherical surface configuration. The necessity of cutting the gores in a tapered shape necessarily involved more work in construction and assembly of the structure and resulted in a less versatile use of the strips of sheet material. Once the material was tailored to be used in a particular location in the structure it could not readily be shifted to another location nor could it be used if it was desired to modify the shape of the structure. The present concept of using non-tailored strips of uniform width or partially tailored strips having side edges which converge toward one end, therefore, provides an improved departure from prior practices in that it requires less work in construction and assembly and it provides material which is more versatile if it becomes desirable to change the shape of the inflated structure to some different configuration or to shift the location in which the individual strips of material are used within the shelter. When using non-tailored or partially tailored strips in a shelter such as shown in FIGS. 1 and 2, the excess width of material which is present in the location where the radial cables 2 converge toward the radially inner end thereof is permitted to extend outwardly from the shelter beyond the cables 2 and form pleats or bulges indicated by the numeral 9. As may be seen in FIGS. 6 through 8, the distance which the pleats 9 extend beyond the cables 2 is related to the amount of width between the cables at any given location along their length. For example, in FIG. 8 the cables 2 are spaced farthest apart and hence the material strips 6 do not extend as far beyond the cables 2 as they do in FIG. 7 where the cables are closer together or in FIG. 6 where the cables are even closer together than they are in either FIGS 7 or 8. In other words, the height of the pleats 9 is greatest at the radially innermost end of the cables 2 at the point where they attach to the retaining ring 4 and such height progressively decreases radially outwardly as the space between the radial cables increases. In most instances, the width of the strips 6 will be approximately the same as or slightly wider than the distance between each adjacent pair of cables 2 where they are anchored at the outer periphery of the shelter 1. As the cables 2 converge toward the radially inner end, the excess material between the cables becomes greater and greater and hence the pleats 9 will extend higher and higher above the cables as it approaches the radially inner ends of the cables. This same principle applies when using either the non-tailored strips 6a or the partially tailored strips 6b; however, the pleats will not be as high when using the strips 6b as when using strips 6a.

FIG. 12 shows in detail a typical seam of the enclosure in which two adjacent sheets 6 of envelope material are wrapped around one of the reinforcing cables 2 and clamped by a plurality of spring clamps 10 bearing against a pair of opposed pressure strips 11 which hold the two adjacent marginal edges of the strips 6 in position wrapped around the cable 2. This typical seam structure may also be seen in FIGS. 7 through 8 and in FIG. 10 which shows the manner in which the clamps 10 close off the radially inner end of one of the pleats 9 thereby preventing escape of internal air pressure from the shelter at that location.

Figure 13:
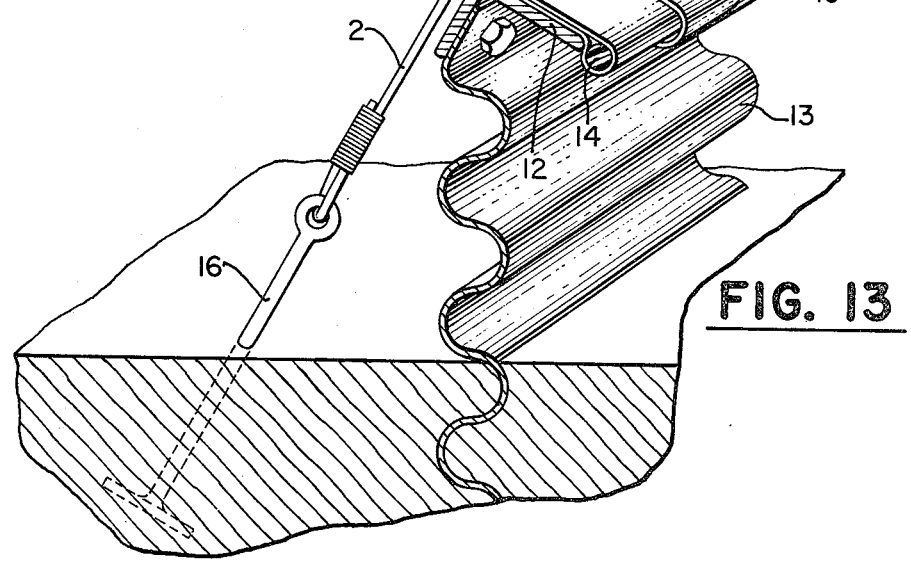
FIG. 13 is a fragmentary perspective view showing one concept for anchoring the reinforcing cables and the lower peripheral edge of the envelope material of the various shelter configurations shown in this specification.

The lower peripheral edges of the strips 6 are similarly clamped as shown in FIG. 13 by clamps 10 to a horizontally extending flange 12 which is fastened to a sheet 13 of corrugated steel or other sufficiently rigid material, the lower part of which is embedded in the ground or base 3 of the shelter. The lower marginal edge of each strip 6 is wrapped around a filler member 14 which provides an enlarged edge which may be gripped between the flange 12 and a pressure strip 15 held in position by the clamps 10. Each of the cables 2 has its lower end attached to a suitable anchor member 16 embedded in the ground as shown in FIG. 13.

Figure 10:
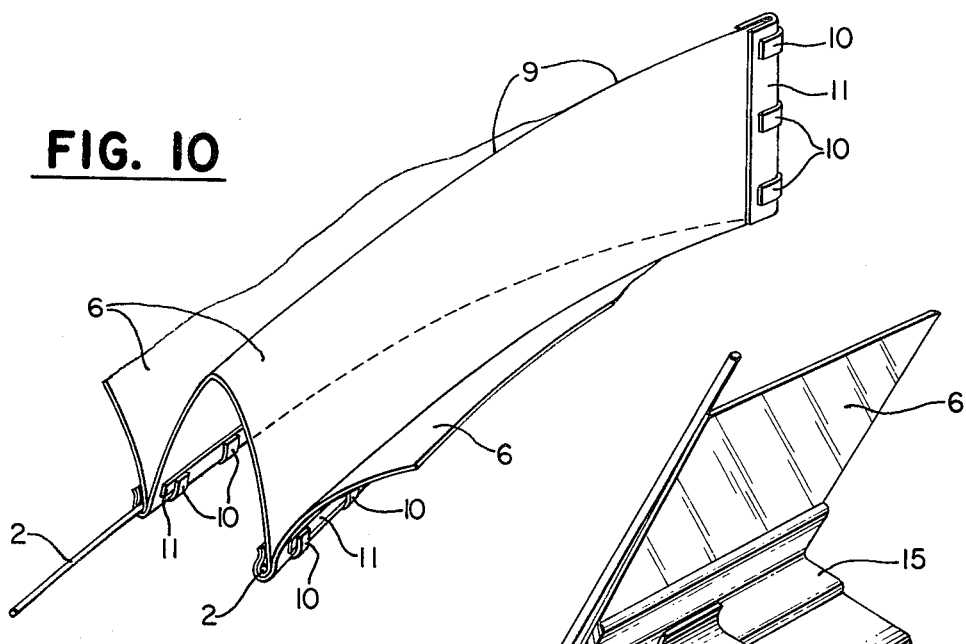
FIG. 10 is a fragmentary perspective view showing a pleated portion of envelope material connected to reinforcing cables near the apex of the inflatable shelter shown in FIGS. 1 and 2.

The radially inner ends of the cables 2 are attached as previously mentioned to a center retaining ring 4 which is shown in greater detail in FIG. 9. For purposes of illustration, the ring is shown as having a lower cable-retaining portion 17 having circumferentially spaced apart holes 18 for receiving the radially inner end of the cables 2. The cables 2 are fastened by cable clamps or any suitable means. An upper cylindrical portion 19 is attached to the cable-retaining portion 17 by a plurality of grooves 20. A cover cap 21 is fastened to the top of the ring 4 by screws 22. The cover cap 21 has a radially outwardly extending flange 23 around a circumference thereof which extends over the pleats 9 of the envelope to prevent rain from leaking into the shelter at this location. For simplicity, FIG. 9 does not show the manner in which the ends of the pleats 9 are clamped; however, this is illustrated in FIG. 10. To provide greater flexibility of the shelter under varying wind conditions, the radially inner ends of the pleats need not be attached to the ring 4 but rest loosely in position in which they are retained by the cables 2.

FIG. 11 illustrates the use of more than one retaining ring at the radially inner ends of the cables 2. For example, one set of cables 2A are joined to an inner ring 4A. A second set of cables 2B are joined to a concentric outer ring 4B. As shown, every other cable is alternately joined to either the inner ring 4A or the outer ring 4B. The use of two rings provides a distribution of the stresses in the cables so that each ring carries only half the stress that it would carry if all cables were connected to one ring. When two rings are used, they may be covered by a suitable cover such as the cap 21 shown in FIG. 9 or they may be covered by a piece of the flexible sheet material similar to that used to form the strips 6.

Figure 15:
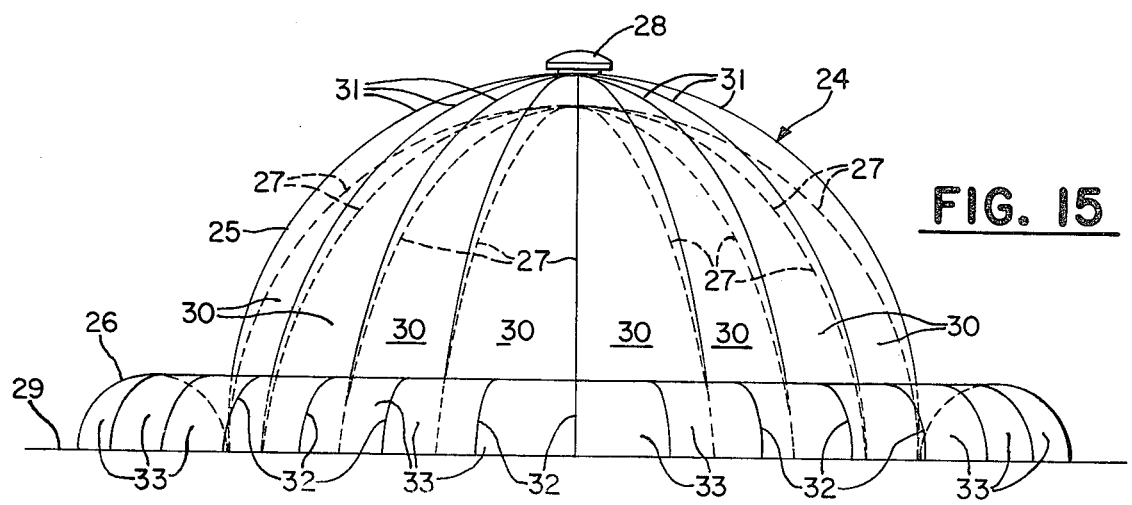
FIG. 15 is a side elevational view of the shelter shown in FIG. 14.
Figure 14:
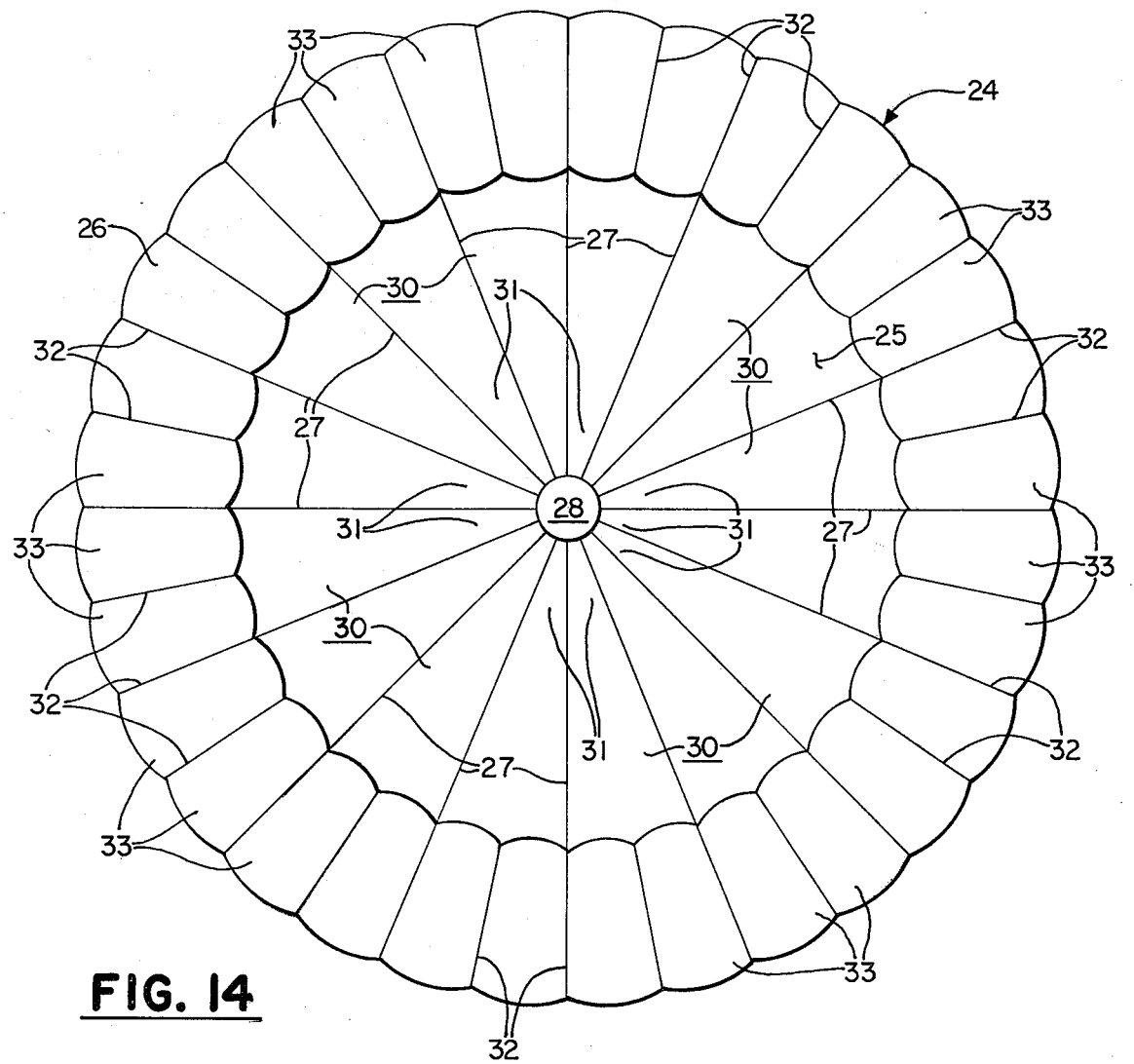
FIG. 14 is a top plan view of another embodiment of the invention showing a combined spherical and torus shaped shelter.

Referring now to FIGS. 14 and 15, there is shown a shelter 24 made up of a combined spherical shape 25 substantially identical to the shelter 1 surrounded by a torus shape 26. The details of construction of the cables with the strips of envelope material are assembled in essentially the same manner as that previously described with regard to FIGS. 1 and 2 and for simplicity, will not be described in great detail. However, for the purposes of identification, the spherical portion 25 has a plurality of radial cables 27 similar to the cables 2 in FIG. 1 having their radially inner ends joined to a ring 28 and their radially outer ends anchored to a base 29. Connected between the cables 27 are strips 30 similar to the strips 6. The strips 30 are formed in pleats 31 similar to the pleats 9. The torus shaped portion 26 has a plurality of radially extending cables 32 having one end anchored to the outer periphery of the base 29 and the inner end anchored to the base 29 at the inner periphery of the torus. Part of the cables 32 may be anchored at the same point as the radially outer ends of the cables 27. Between each of the cables 32 is connected a strip of sheet material 33 of uniform width which forms a pleat or bulge near the radially inner ends of the cables 32 based upon the same principle previously described due to the excess material present at the location where the cables 32 are closer together. Thus it may be seen that a spherical and torus shape may be combined to provide a shelter having a modified exterior contour from that shown in FIGS. 1 and 2, but utilizing the same principles of using strips of non-tailored or partially tailored material rather than precisely tailoring either the strips used in the spherical portion or in the torus portion.

Figure 16:
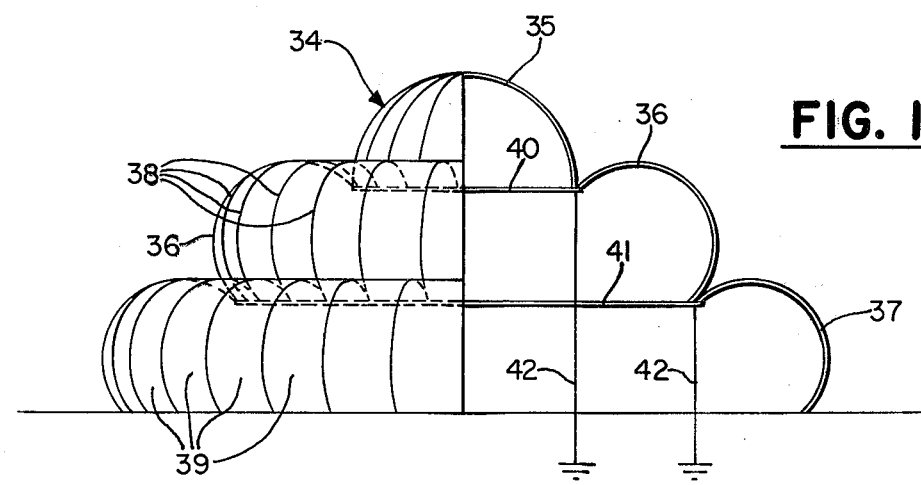
FIG. 16 is a side elevational view of another embodiment of the invention using combined spherical and torus shapes and having a portion broken away to show vertical internal tether cables.

An additional modification of the invention is seen in FIG. 16 which shows a shelter 34 combining a spherical shape 35 with a pair of modified torus shapes 36 and 37. The shelter 35, like the previously described shelter, uses a plurality of radially extending cables 38 with strips 39 of sheet material connected therebetween and forming pleats similar to those in the previously described shelters. The shelter 34 differs in that a pair of horizontal circumferential rings 40 and 41 extend around the circumference of the shelter 34 and in combination with a plurality of vertical tether cables 42 retain the cables 38 in such a manner that they form a different cross-sectional contour in the shelter than that previously shown in the other embodiments.

Figure 17:
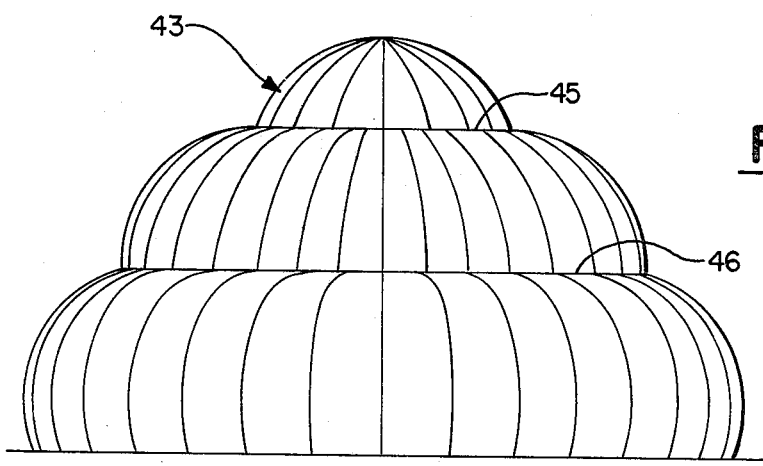
FIG. 17 is another embodiment of the invention showing combined spherical shapes forming an inflatable shelter with horizontal peripheral retaining rings to form a shelter having a particular contour.

FIG. 17 shows a shelter 43 which is similar in many respects to the shelter 34 but without using any vertical tether cables such as the cables 42 in FIG. 13. The structure 43 uses a pair of circumferential horizontal rings 45 and 46 which modify the cross-sectional contour of the shelter in a manner different from the previously described shelters.

Figure 18:
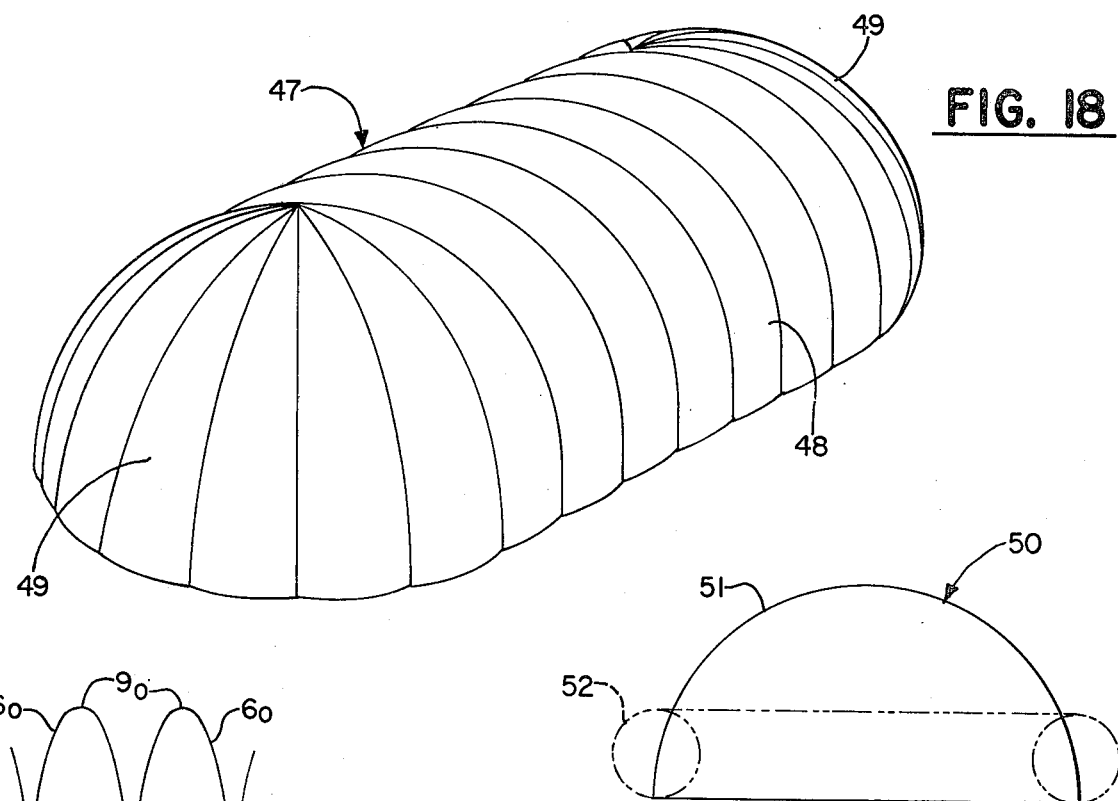
FIG. 18 is a perspective view showing another embodiment of the invention in which a portion of a spherical shelter construction is used to form the ends of a shelter having an intermediate portion in the shape of part of a cylinder.
Figure 19:
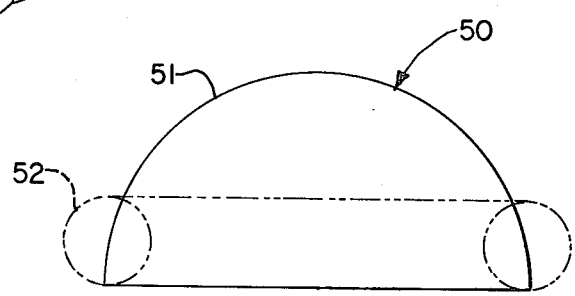
FIG. 19 is a simplified diagrammatic elevational view showing the manner in which a spherical shelter can be converted to an open topped structure having torus shaped walls.

FIG. 18 illustrates a shelter 47 having a cylindrical intermediate portion 48 and a pair of hemispherical end portions 49 which utilize the same principles of construction as that used in FIGS. 1 and 2. This figure illustrates how the spherical construction can be combined with the cylindrical or other configuration to form a further modification in building contour. An additional advantage of the invention is shown in FIG. 19 in which a shelter 50 may be converted from a spherical shelter 51 as shown in solid lines to a torus structure 52 having an open top as indicated by the dotted line. The spherical structure shown in FIGS. 1 and 2 may be converted to the torus configuration 52 illustrated in FIG. 19 by disconnecting the radially inner ends of the cables 2 and at least part of the strips 6 from the cables 2 and then reconnecting the radially inner ends of the cables 2 to the base either at the same point as the radially outer end of each cable or at some distance on the base radially inwardly therefrom and then reconnecting the strips 6 to the cables 2 in such manner as to form a torus configuration when the envelope is inflated. Since both the spherical and torus configuration utilize non-tailored strips of uniform width or partially tailored strips, no additional tailoring of the material is necessary to convert from either the spherical shape to the torus shape or from the torus shape to the spherical shape. This provides a great degree of versatility in the construction of inflatable buildings which may be disassembled and reassembled many times during their use. While many of the basic spherical and torus shapes have been shown herein for purposes of illustrating the invention, it will be obvious that other variations and combinations of cable reinforced structures may utilize the principles of non-parallel cables which converge toward each other at one end of the cable while using sheet material of uniform width connected between the cables with the excess material being utilized in the form of pleats extending outwardly from the cables when the shelter is inflated.

Figure 21:
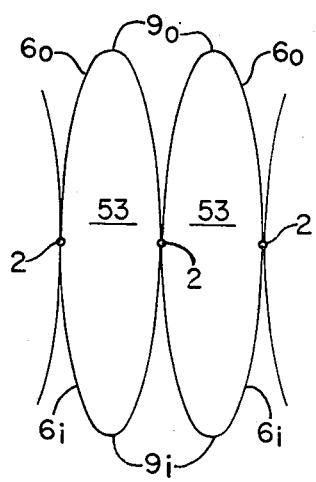
FIG. 21 is a cross-sectional view similar to FIG. 6 but showing a double wall construction.
Figure 20:
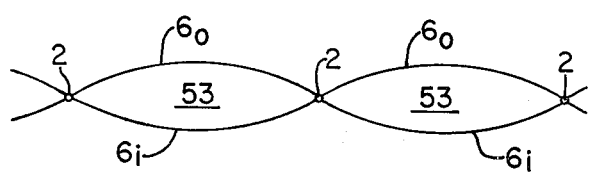
FIG. 20 is a cross-sectional view similar to FIG. 8 but showing a double wall construction.

The concept of using non-tailored or partially tailored strips of material as previously described can be used equally well in a dual wall structure as illustrated in FIGS. 20 and 21. FIG. 20 is a cross-section similar to FIG. 8 except that it has outer strips $6_o$ and inner strips $6_i$ fastened to cables 2 and forming air channels or chambers 53 therebetween. FIG. 21 is a cross section similar to FIG. 6 showing the dual wall configuration taken closer to the apex of the building with the cables 2 spaced closer together and the inner and outer strips $6_i$ and $6_o$ forming higher pleats $9_i$ and $9_o$ respectively. For additional variation in contour, the inner and outer strips may be of different widths from each other, thereby forming pleats of a different height on the inside from that on the outside.

These and other modifications may be made in the embodiments shown herein without departing from the scope of the invention.

I claim:

1. An inflatable enclosure having its lower peripheral edges attached to a base, the enclosure comprising:
   A. a plurality of flexible non-parallel reinforcing members, each having a first end attached along the periphery of the base in spaced relationship from each other;
   B. a second end of each of the members being fastened at a location radially inwardly of the first ends, in closer spaced relationship to each other than the first ends, thereby causing the members to converge toward each other from the first to the second ends thereof; and
   C. a cover envelope comprising elongated strips of flexible sheet material of substantially uniform width throughout their length attached between the reinforcing members;

D. the width of each strip of sheet material being substantially the same as the distance between the reinforcing members at the first ends but becoming progressively greater than the distance between the reinforcing members radially inwardly toward the second ends as the members converge toward each other;

E. the excess width of material between the members being forced outwardly by internal pressure in the enclosure when inflated whereby the sheet material extends a greater distance outwardly of the reinforcing members near the radially inwardly positioned second ends than it does near the radially outwardly positioned first ends.

2. An inflatable enclosure as claimed in claim 1 wherein the enclosure when inflated assumes substantially the shape of a portion of at least one sphere.

3. An inflatable enclosure as claimed in claim 1 wherein the enclosure when inflated assumes substantially the shape of a portion of at least one torus.

4. An inflatable enclosure as claimed in claim 1 wherein the enclosure when inflated assumes substantially the combined shapes of a portion of at least one sphere and a portion of at least one torus.

5. An inflatable enclosure as claimed in claim 1 wherein the second ends of the reinforcing members are attached to a center ring and the members extend radially outwardly therefrom to the point where the first ends of the members are attached to the base of the enclosure.

6. An inflatable enclosure as claimed in claim 1 wherein part of the second ends of the reinforcing members are attached to a first ring and the remainder of the second ends are attached to a second ring in axial alignment with the first ring.

7. An inflatable enclosure as claimed in claim 1 wherein the cover envelope is of double wall construction forming inflatable channels therein.

8. An inflatable enclosure as claimed in claim 1 wherein the enclosure has a round peripheral shape at the base and wherein the reinforcing members extend radially inwardly toward the center of the enclosure from where they are attached to the periphery of the base and wherein at least part of the members meet at an apex at the top of the enclosure and at the axial center thereof.

9. An inflatable enclosure as claimed in claim 8 including at least one intermediate ring encircling the enclosure in a horizontal plane between the apex and base thereof and attached to at least part of the reinforcing members to hold them in a substantially fixed radial position with respect to the axis of the enclosure.

10. An inflatable enclosure as claimed in claim 9 wherein vertical tether members each have one end connected to spaced locations around the intermediate ring and the opposite end connected to the base to hold the intermediate ring at a fixed height above the base.

11. An inflatable shelter as claimed in claim 1 wherein the lower edges of the strips of sheet material forming the envelope are clamped to an upwardly extending rigid anchor member comprising a sheet of corrugated metal part of which extends below the surface of the base and part of which extends above the surface of the base.

12. An inflatable enclosure having its lower peripheral edges attached to a base, the enclosure comprising:

A. a plurality of inextensible elongated flexible reinforcing members extending radially outwardly from a common apex to the periphery of the base of the enclosure;

B. the spaced apart relationship of the reinforcing members being greatest where the ends attach to the periphery of the base of the enclosure and progressively decreasing radially inwardly toward said common apex; and C. a cover envelope comprising elongated strips of flexible sheet material of substantially uniform width throughout their length, attached between the reinforcing members to cover the area embraced by the enclosure;

D. the marginal side edges of each strip of sheet material being connected between a pair of the reinforcing members;

E. the assembled envelope and reinforcing members arranged to give the enclosure substantially the shape of a portion of a sphere but having a sufficient excess width of envelope material between each adjacent pair of reinforcing members to provide an outwardly extending pleat therebetween which extends outwardly beyond the reinforcing members the least distance near the base of the enclosure and extends progressively farther and farther outwardly beyond the reinforcing members in the direction from the base to the apex of the enclosure, with the pleat extending outwardly the greatest distance near the apex of the enclosure.

13. An inflatable enclosure as claimed in claim 12 wherein the radially inner ends of the reinforcing members are connected to a ring member surrounding the apex of the enclosure.

14. An inflatable enclosure as claimed in claim 12 wherein the radially inner ends of part of the reinforcing members are connected to a first ring member surrounding the apex of the enclosure and the radially inner ends of the remaining reinforcing members are connected to a second ring member concentric with the first ring member.

15. An inflatable enclosure as claimed in claim 12 wherein the cover envelope is of double wall construction forming inflatable channels therein.

16. An annular shaped inflatable enclosure having its lower peripheral edges attached to a base, the enclosure comprising:

A. a plurality of flexible non-parallel reinforcing members each having:
  1. a first end attached to the base of the enclosure at spaced apart locations along a first circular periphery of the enclosure, and
  2. a second end attached to the base of the enclosure at spaced apart locations along a second circular periphery of the enclosure,
  3. the second periphery being concentric with the first periphery and radially inwardly therefrom,
  4. the second ends of the reinforcing members being spaced closer together than the first ends of the reinforcing members; and B. a cover envelope of double wall construction comprising:
  1. elongated inner and outer strips of sheet material forming inflatable channels therebetween,
  2. the marginal side edges of each strip of material being connected between two adjacent reinforcing members, 3. the ends of the strips of material being connected in sealing engagement respectively with the first and second peripheral edges of the enclosure,
4. the strips of material being wider than the distance between the reinforcing members at least adjacent the second ends thereof,
5. the excess material of the outer strips of sheet material being forced by internal pressure when the enclosure is inflated to extend outwardly beyond the reinforcing members at least near the second ends thereof.
6. the envelope as restrained by the reinforcing members forming an enclosure, which when inflated assumes the shape of a portion of at least one torus.

17. An annular shaped enclosure as claimed in claim 16 having an enclosure in the center thereof in the shape of a portion of a sphere.

18. An annular shaped enclosure as claimed in claim 16 combined with at least one additional annular enclosure concentric therewith.

19. An inflatable enclosure having its lower peripheral edges attached to a base, the enclosure comprising:
A. a plurality of inextensible elongated flexible reinforcing members extending radially outwardly from a common apex to the periphery of the base of the structure;
B. the spaced apart relationship of the reinforcing members being greatest where the ends attach to the periphery of the base of the enclosure and progressively decreasing toward said common apex; and
C. a cover envelope of double wall construction comprising elongated strips of flexible sheet material attached between the reinforcing members to cover the area embraced by the shelter and forming inflatable channels therebetween;
D. the marginal side edges of each strip of sheet material being connected between a pair of the reinforcing members;
E. the assembled envelope and reinforcing members arranged to give the enclosure substantially the shape of a portion of a sphere but having a sufficient excess width of envelope material between each adjacent pair of reinforcing members to provide an outwardly extending pleat therebetween which extends outwardly beyond the reinforcing members the least distance near the base of the shelter and extends progressively farther and farther outwardly beyond the reinforcing members in the direction from the base to the apex of the shelter.

* * * * *